(12) United States Patent
Rick

(10) Patent No.: US 7,363,507 B2
(45) Date of Patent: Apr. 22, 2008

(54) DEVICE AND METHOD OF PREVENTING PIRATED COPIES OF COMPUTER PROGRAMS

(75) Inventor: Ralf Rick, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 493 days.

(21) Appl. No.: 09/750,423

(22) Filed: Dec. 28, 2000

(65) Prior Publication Data

US 2002/0087870 A1 Jul. 4, 2002

(30) Foreign Application Priority Data

Dec. 29, 1999 (DE) ................. 199 63 471

(51) Int. Cl.
*G06F 11/30* (2006.01)
*G06F 12/14* (2006.01)
*G06F 7/04* (2006.01)
*G06F 7/58* (2006.01)
*G06F 15/16* (2006.01)
*H04L 9/32* (2006.01)
*G06K 9/00* (2006.01)
*H04K 1/00* (2006.01)
*H04L 9/00* (2006.01)

(52) U.S. Cl. .................. 713/189; 713/192; 713/193; 726/7; 726/9; 726/21; 726/31; 726/32; 726/33; 705/51; 705/52; 705/53; 705/54; 705/55; 705/56; 705/57; 705/58; 705/59

(58) Field of Classification Search ............ 705/51–59, 705/24; 713/200, 192, 193, 189; 395/184, 395/186, 182; 380/3, 4, 25; 726/7, 9, 21, 726/22, 31, 32, 33
See application file for complete search history.

(56) References Cited

U.S. PATENT DOCUMENTS

| 4,924,378 | A | * | 5/1990 | Hershey et al. ............. 713/201 |
| 5,109,413 | A | * | 4/1992 | Comerford et al. ............ 705/54 |
| 5,343,524 | A | * | 8/1994 | Mu et al. ...................... 705/55 |
| 5,473,692 | A |   | 12/1995 | Davis |
| 5,826,011 | A |   | 10/1998 | Chou et al. |
| 5,917,908 | A | * | 6/1999 | Takenaka et al. ............ 713/190 |
| 5,925,127 | A | * | 7/1999 | Ahmad ........................ 713/200 |
| 6,006,190 | A |   | 12/1999 | Baena-Arnaiz et al. |
| 6,023,763 | A | * | 2/2000 | Grumstrup et al. ......... 713/200 |
| 6,226,747 | B1 | * | 5/2001 | Larsson et al. ............. 713/200 |
| 6,334,118 | B1 | * | 12/2001 | Benson ......................... 705/52 |
| 6,411,941 | B1 | * | 6/2002 | Mullor et al. ................ 705/59 |
| 6,434,535 | B1 | * | 8/2002 | Kupka et al. ................ 705/24 |
| 6,523,119 | B2 | * | 2/2003 | Pavlin et al. ............... 713/192 |
| 6,550,011 | B1 | * | 4/2003 | Sims, III ..................... 713/193 |
| 2001/0011254 | A1 | * | 8/2001 | Clark ............................ 705/59 |

FOREIGN PATENT DOCUMENTS

| EP | 0 302 710 |   | 2/1989 |
| JP | 06051975 A | * | 2/1994 |
| WO | WO 91/01586 |   | 2/1991 |
| WO | WO 9406071 A1 | * | 3/1994 |

* cited by examiner

*Primary Examiner*—Ayaz Sheikh
*Assistant Examiner*—Shin-Hon Chen
(74) *Attorney, Agent, or Firm*—Kenyon & Kenyon LLP

(57) ABSTRACT

A device and a method of preventing pirated copies of computer programs. The device has input and output devices for bidirectional data exchange with an electronic computer and a first memory element containing a data file that can be transferred to the electronic computer over the output device. In addition, a second memory element into which data can be written via the input device is also provided. The method includes the following steps. First, this device is connected to an electronic computer for bidirectional data exchange. Then a first data file containing an electronic key is transferred from the device to the electronic computer. Subsequently a second data file containing an identifier of the electronic computer is copied from the electronic computer to the device.

15 Claims, 4 Drawing Sheets

DEVICE AND METHOD OF PREVENTING PIRATED COPIES OF COMPUTER PROGRAMS

BACKGROUND INFORMATION

A computer program stored on a data carrier can be copied any number of times. Manufacturers of commercial computer programs have therefore attempted to protect their products from unauthorized copying or to ensure that unauthorized copies of their computer programs will not run.

Use of a so-called dongle is a special type of copy protection device. A dongle is a hardware module that must be inserted into a module port of a computer in order to use the respective computer program. The program will not run without the dongle. Although the computer program can be copied as often as desired, it can run only on a computer having a dongle inserted in the module port.

However, one disadvantage is that the dongle must always remain inserted into the module port of the computer, usually the serial or parallel port, when using the program. This means that one port of the computer is occupied. Furthermore, the program can no longer be used if the dongle is lost. If several computer programs protected in this way are installed on a computer, the user must change dongles if there are too few available ports.

International Patent Publication No. WO 91/1586 describes a dongle that transfers a data file to the computer on installation of the program and modifies the installed program, which cannot run at first, so that it can be used. Then the dongle is no longer necessary and can be removed. This ensures that the computer program will be used on only one computer. However, then the user does not have the option of installing the program on another computer at a later time because the dongle cannot be reused after a single use.

Therefore, an object of the present invention is to provide a device and a method for preventing bootleg copies of computer programs which will make it possible to use a computer program on different computers at different times.

SUMMARY OF THE INVENTION

The present invention starts with a device having input and output means for a bidirectional data exchange with an electronic computer and a first memory element. The first memory element contains a data file which is to be transferred over the output means to the electronic computer. In the device according to the present invention, there is a second memory element into which data can be written by the input means.

The first and second memory elements are preferably integrated into a memory chip. A nonvolatile semiconductor memory such as a ROM is preferably used as the memory chip.

In an advantageous embodiment of the present invention, the input and output means of the device are designed to correspond to the module port of a computer. The device may have, for example, a jack or a plug that can be inserted into an interface of the computer. In this case, bidirectional data exchange takes place over the assigned interface.

The method according to the present invention includes several process steps. First, the device described above is connected to an electronic computer to permit bidirectional data exchange between the computer and the device. Then a data file containing an electronic key is transferred from the device to the computer. The data file is then only on the computer. As an alternative, the data file may also be copied from the device to the computer and then erased on the device. Following that, a second data file is copied by the computer onto the device. This second data file contains an unambiguously assigned computer identifier. Since the device contains the computer identifier, the electronic key can be transferred back again. The dongle can then be connected to another computer and the key transferred to it. In this way, it is possible to use one computer program on several different computers at different times.

In a preferred embodiment of the method according to the present invention, an encoded enable number is also entered into the computer. On purchasing a program, the customer receives an enable number which has been encoded, i.e., encrypted in the device. On installation of the program, the enable number must be entered. When the program starts, the enable number is decoded with the help of the key and thus certain program modules or different modes are activated. In this way, the seller can provide the customer with an evaluation version or a demo version that can be run only for a certain period of time. If the customer then wants another module or a full version at a later time, he need only be provided with a new enable number. A customer can be provided with this number without any special measures because the enable number can be used only with the proper device.

After the key has been transmitted, the device can be removed again. It is no longer necessary but it is not useless. If the user would like to use the program on another computer at a later time, he must simply connect the device to the computer again. The device then recognizes the computer on the basis of the unambiguous identifier stored in it. After the identifier has been checked, the key can be transferred back again. Then the device can be used with another computer.

DETAILED DESCRIPTION

Figure 1:
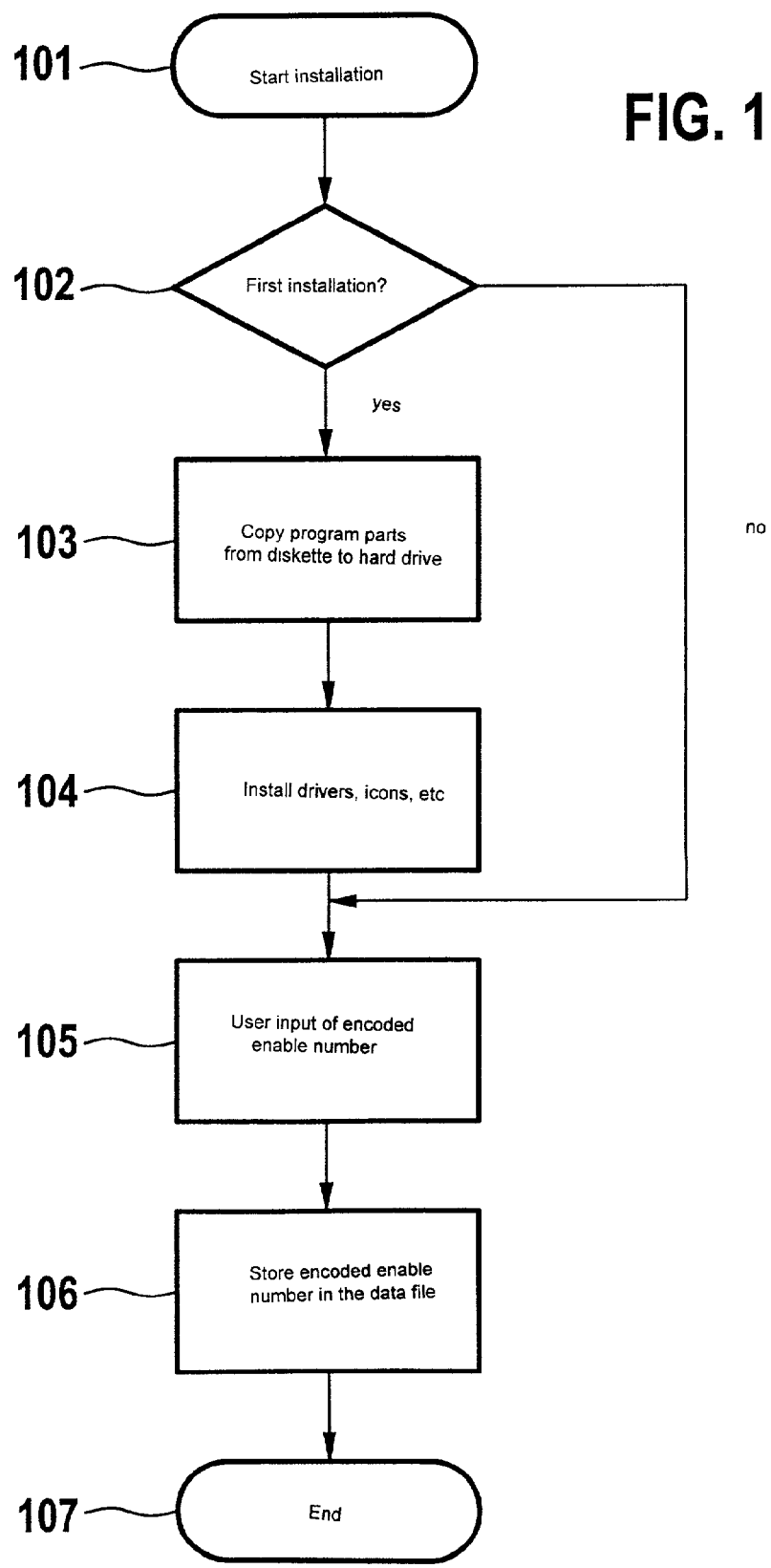
FIG. 1 shows a flow chart of how a program with an enable number is installed from a diskette onto the hard drive of a computer.

FIG. 1 shows a flow chart of how a program with an enable number is installed from a diskette onto the hard drive of a computer.

The installation begins with step 101. Then in step 102 the user is asked whether he would like to install the program. If this is the case, then in step 103 program components are installed from the diskette onto the hard drive of the computer, and then drivers, icons and other modules are installed in step 104. Next in step 105, the user enters the encrypted enable number. If the user decides against installation in step 102—perhaps the required program modules have already been installed previously—then the program continues directly with step 105. The encrypted enable number that has been entered is stored in a data file in step 106. The installation ends with step 107.

Figure 2:
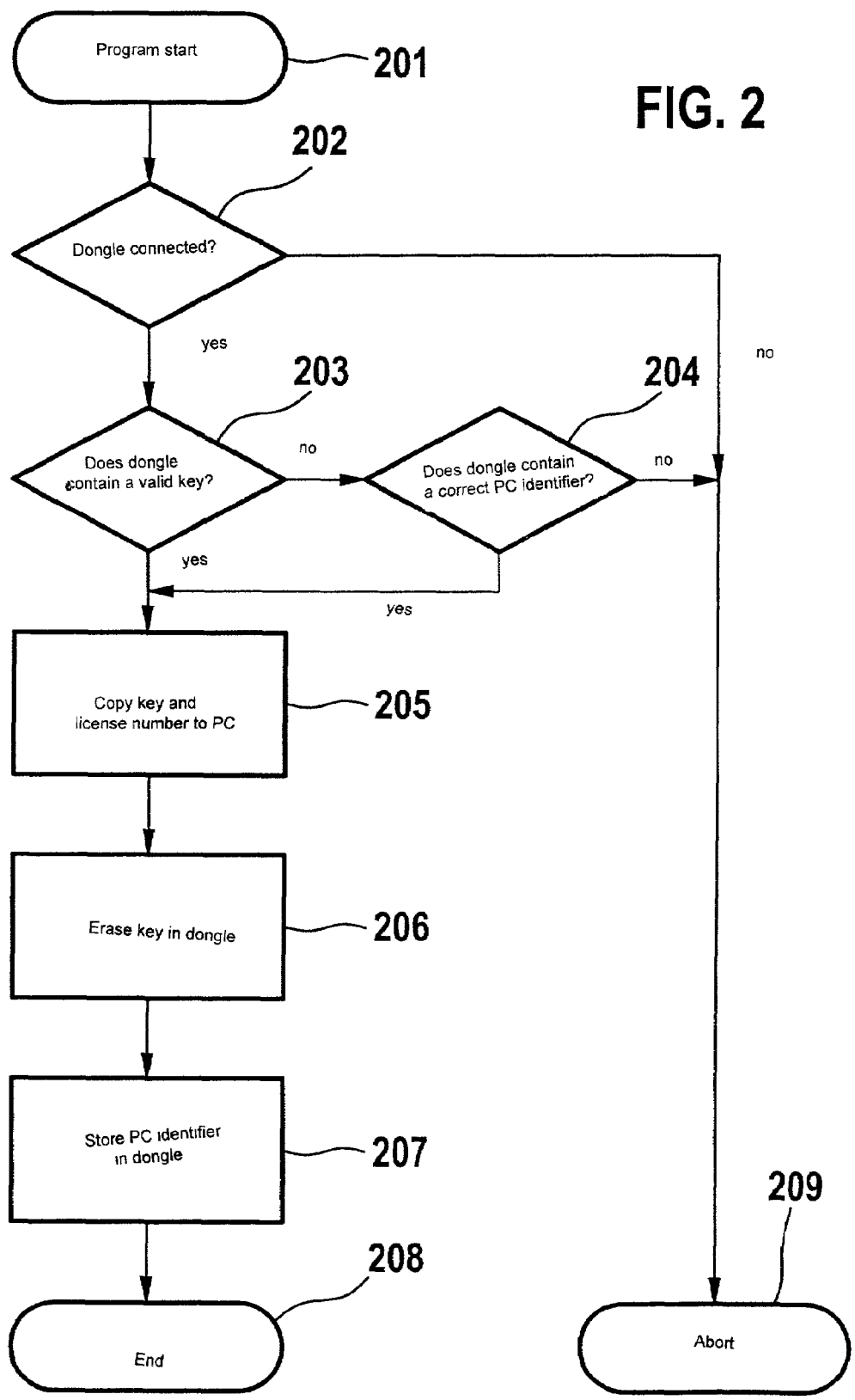
FIG. 2 illustrates how the program is enabled in a computer, i.e., PC, for use with a device according to the present invention, referred to here as a dongle.

FIG. 2 illustrates how the program is enabled in a computer, i.e., PC, for use with a device according to the present invention, referred to here as a dongle.

The program starts with step 201. In step 202 a check is performed to determine whether a dongle is connected. If this is not the case, the program is aborted in step 209. If a dongle is connected, then a check is performed in step 203 to determine whether it contains a valid key. If this is not the case, then a check is performed in step 204 to determine whether the dongle contains the correct PC identifier. The program is aborted if the answer is negative again. If the dongle contains the valid key or the correct PC identifier, then in step 205 the key and the license number of the computer program are copied to the PC. Then in step 206 the key is erased in the dongle. In step 207, the PC identifier is stored in the dongle. The enable process ends with step 208.

Figure 3:
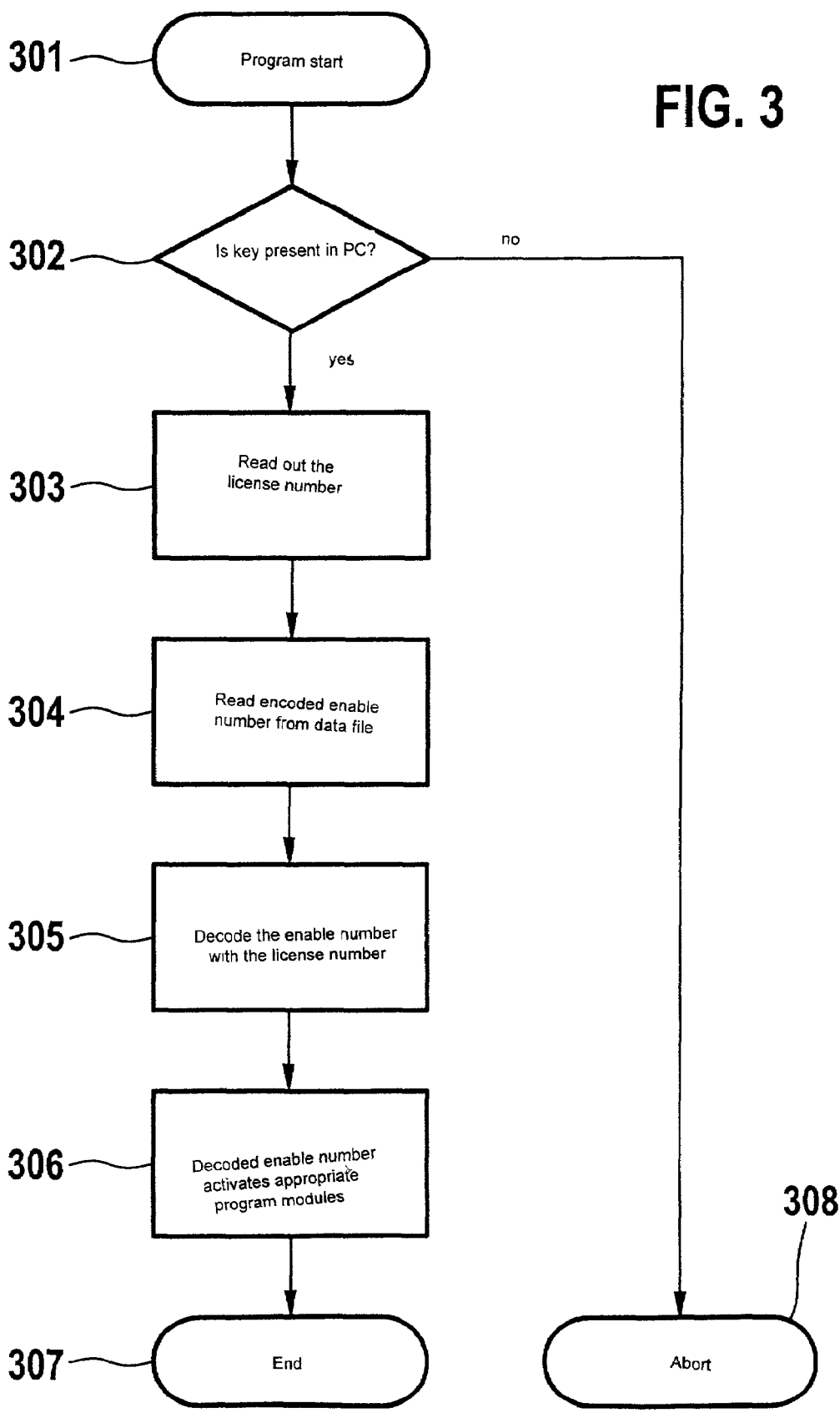
FIG. 3 illustrates how program modules are enabled with the encoded enable number.

FIG. 3 illustrates how program modules are enabled with the encoded enable number.

The program is started with step 301. In step 302 a check is performed to determine whether there is a key in the PC. If there is no key, the program is aborted in step 303. If a key is present, the license number of the computer program is read out in step 303. Then the encoded enable number is read out of a data file in step 304. Next in step 305, the enable number is decoded with the license number and with the help of the key. In step 306 the decoded enable number activates the respective program modules. This process ends with step 307.

Figure 4:
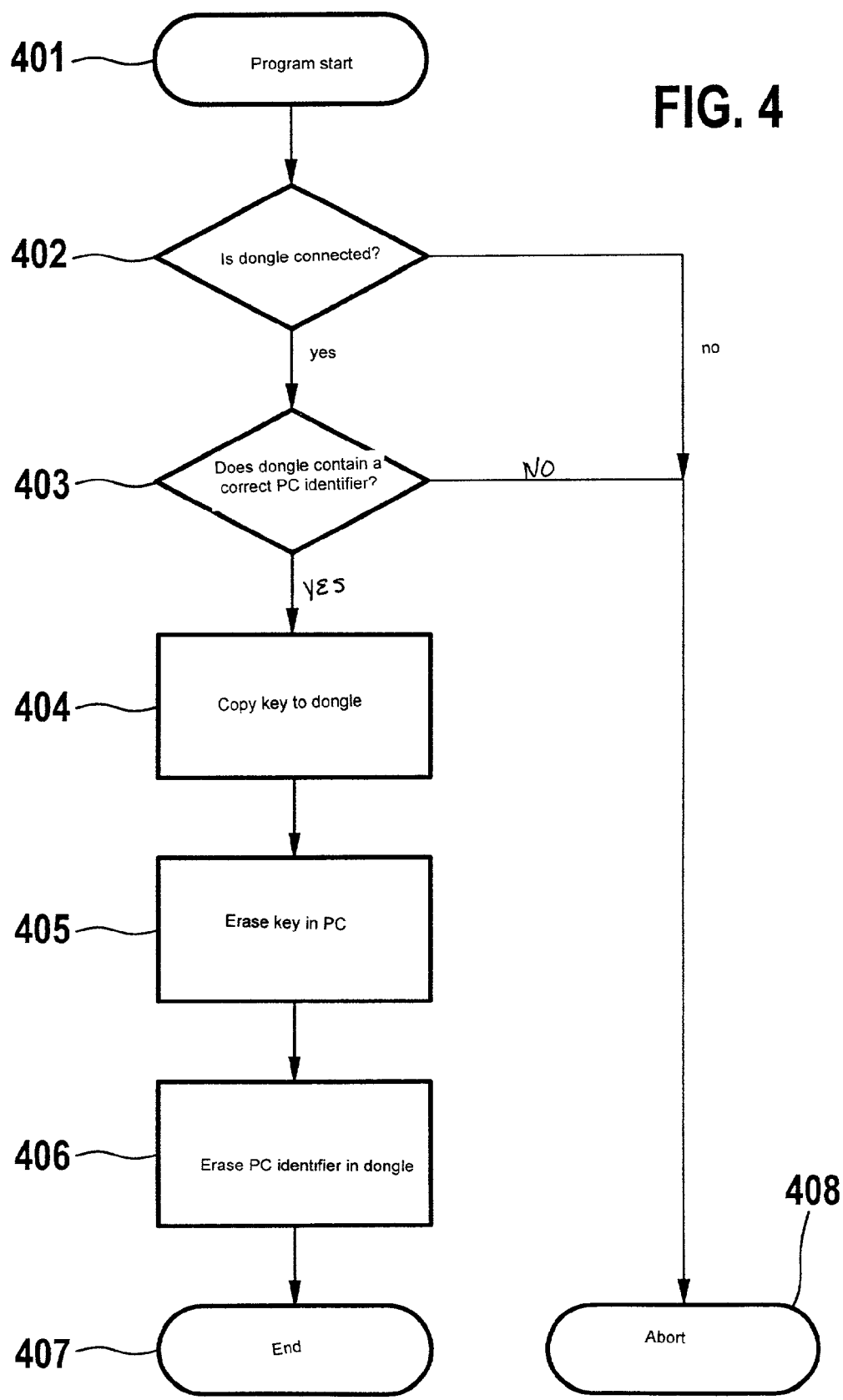
FIG. 4 shows how the program can be blocked for use.

FIG. 4 shows how the program can be blocked for use.

The process begins with step 401. In step 402 a check is performed to determine whether a dongle is connected. If no dongle is connected or otherwise attached, the operation is terminated in step 408. If a dongle is connected, a check is performed in step 403 to determine whether the connected dongle contains the correct PC identifier. If it does not, the operation is aborted. If it does contain the correct PC identifier, the key is copied to the dongle in step 404. Then in step 405, the key in the PC is erased. Following that, the PC identifier in the dongle is erased. The operation ends with step 407.

Since the key is again on the dongle, the dongle can be used to enable the program for running on another computer. This ensures that the program can always run on only one computer at a given time.

A dongle may of course also contain more than one key. For example, if a customer has acquired more than one license, he might either be assigned a corresponding number of dongles each with a separate key or a single dongle with a corresponding number of keys. Multiple dongles with multiple keys could also be issued.

Although the dongle can be connected directly to the computer (PC) on which the program is to be installed, other configurations are also conceivable. In the case of an advantageous embodiment of the present invention, it might be possible to access at least one central dongle containing multiple keys over a network connection, for example. Central software distribution over a large area, in particular throughout a corporation, would thus be possible with the present invention.

If the dongle does not have enough memory for the various PC identifiers and keys, this information could be stored on a data file in an advantageous embodiment. To prevent manipulations here, a check identifier, in particular a checksum, is formed with each access to this data file, and then only this check identifier or checksum is stored in the dongle.

Software can thus be produced and reproduced in mass production in an advantageous manner without having to apply individual identifiers to the data medium.

What is claimed is:

1. A device for preventing pirated copies of computer programs for use with a computer, comprising:

input and output devices for bidirectional data exchange with the computer;

a first memory element containing a data file that is transferable to the computer via the output device, the data file including a key uniquely identifying a licensed copy of the computer program; and a second memory element into which data is writable by the input device, the data including an identifier uniquely identifying the computer;

wherein the first memory element and the second memory element are arranged on a memory chip, and wherein the device is configured to erase the key from the first memory element upon a successful transfer of the data file so that a subsequent attempt to transfer the data file to another computer does not result in a transfer of the key to the other computer unless the key has been transferred back to the device from the computer which received the key.

2. The device according to claim 1, wherein the memory chip includes a ROM memory chip.

3. The device according to claim 2, wherein the memory chip is a nonvolatile semiconductor memory.

4. The device according to claim 1, wherein the input and output devices are adapted to a module port of the computer so that the input and output devices are insertable into the module port.

5. The device of claim 1, wherein the key includes an electronic key.

6. The device of claim 1, wherein the data file is transferable to the computer so that the data file is stored on the computer.

7. The device of claim 1, wherein the data file is transferable to the computer so that the data file is removed from the device.

8. The device of claim 1, wherein the data file is transferable to the computer so that the data file is stored on the computer and removed from the device.

9. A method of preventing pirated copies of computer programs, comprising the steps of:

connecting a device to a computer for bidirectional data exchange, the device including input and output devices and first and second memory elements;

transferring a first data file containing a key from the first memory element of the device to the computer, the key uniquely identifying a licensed copy of the computer program;

copying a second data file containing an identifier from the computer to the second memory element of the device, the identifier uniquely identifying the computer; and erasing the key from the from the first memory element if the transfer of the first data file was successful so that a subsequent attempt to transfer the data file to another computer does not result in a transfer of the key to the other computer unless the key has been transferred back to the device from the computer which received the key.

10. The method according to claim 9, further comprising the step of entering into the computer an enable number encoded with the key.

11. The method according to claim 9, further comprising the step of transferring the key from the computer back to the connected device after checking the identifier.

12. A data carrier storing a computer program, the computer program being executable by entering the data carrier into a computer, the data carrier containing a key and an identifier, the key uniquely identifying a licensed copy of the computer program and the identifier uniquely identifying the computer, upon execution, carrying out the following steps:
   transferring a first data file containing the key from a first memory element of a device to the computer, the device further including input and output devices; and
   copying a second data file containing the identifier from the computer to a second memory element of the device,
   erasing the key from the first memory element upon a successful transfer of the data file so that a subsequent attempt to transfer the data file to another computer does not result in a transfer of the key to the other computer unless the key has been transferred back to the device from the computer.

13. A method of preventing a pirated copy of a computer program, comprising:
   determining whether a dongle is connected to a computer;
   checking whether the dongle contains a correct computer identifier when the dongle is connected to the computer;
   copying a key to the dongle when the dongle contains the correct computer identifier, the key uniquely identifying a licensed copy of the computer program;
   erasing the key from a first memory element of the computer if a transfer of the key to the dongle is successful so that a subsequent attempt to transfer the key to another computer does not result in a transfer of the key to the another computer unless the key has been transferred back to the computer from the dongle which received the key;
   erasing the computer identifier in the dongle; and
   preventing an execution of the computer program on the computer if the key is erased on the computer.

14. The method of claim 13, further comprising:
   checking whether the key is valid; and
   copying a license number of a computer program to the dongle.

15. The method of claim 14, further comprising:
   reading out the license number of the computer program;
   reading out an enable number that is encoded;
   decoding the enable number using the license number and the key; and
   activating program modules of the computer program using the enable number.

* * * * *